Dec. 18, 1945.  H. D. PHILIPS  2,391,269
FILM SPOOL
Filed Feb. 9, 1942
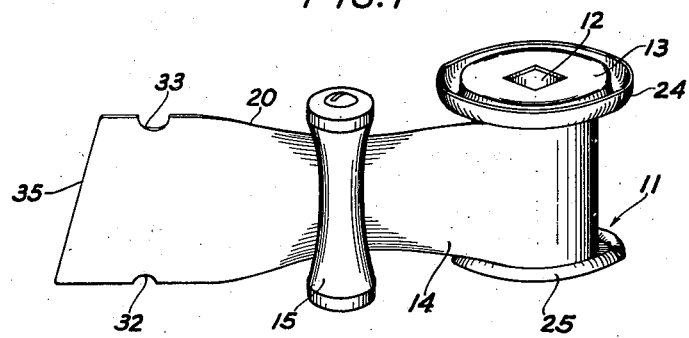
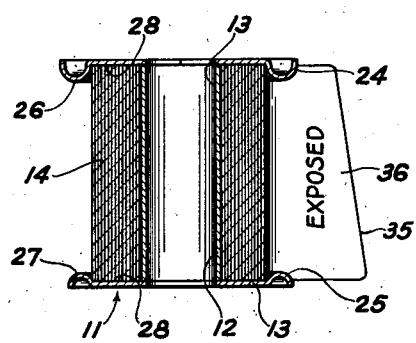
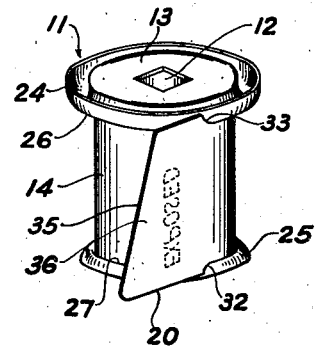
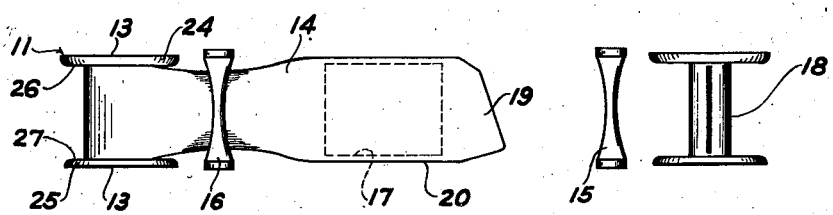
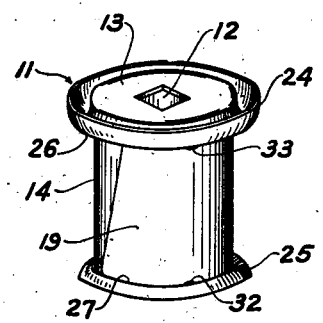
HARLOW D. PHILIPS
INVENTOR
BY
ATTORNEYS Patented Dec. 18, 1945

2,391,269

UNITED STATES PATENT OFFICE 2,391,269

FILM SPOOL

Harlow D. Philips, Rochester, N. Y., assignor to Eastman Kodak Company, Rochester, N. Y., a corporation of New Jersey Application February 9, 1942, Serial No. 429,969

5 Claims. (Cl. 95—9)

The present invention relates to photography, and more particularly to photographic film spools.

The principal object of the invention is the provision on a film spool of a projecting film tab which clearly indicates that the film strip has been exposed.

Another object of the invention is the provision of cooperating means on the film spool and the film strip to retain a trailing tab or portion of the film strip in position to clearly indicate that the film strip has been exposed.

Still another object of the invention is the provision of flanges on the film spools which are spaced apart a distance slightly less than the width of the film strip and are arranged to engage marginal notches in the film strip adjacent the trailing end of the latter to prevent the winding up of said trailing end so as to provide a small projecting tab which may be retained in position to indicate that the film strip has already been exposed.

To these and other ends, the invention resides in certain improvements and combinations of parts, all as will be hereinafter more fully described, the novel features being pointed out in the claims at the end of the specifications.

In the drawing:

Fig. 1 is a perspective view of a film spool and film strip constructed in accordance with the present invention, showing the relation of the film strip near the end of the winding up operation;

Fig. 2 is a transverse sectional view through the spool illustrated in Fig. 1, showing the arrangement for retaining the trailing film strip tab in its indicating position;

Fig. 3 is a perspective view of the film spool with the film strip in its completely wound position in which the trailing tab in its projecting or protruding position to indicate that the film strip has been exposed;

Fig. 4 shows an arrangement in which the film strip may be wound from a separate supply to a takeup spool; and Fig. 5 is a perspective view of the film spool, with the unexposed film strip, as received by the user.

Similar reference numerals throughout the various views indicate the same parts.

The drawing shows a film spool, generally indicated by the numeral 11, formed with a hollow core 12 and spaced end members 13 suitably secured to the opposite ends of the core 12, as clearly shown in Fig. 2. A sensitized miniature photographic film strip 14 is adapted to be wound up on the core 12, in a manner shown in Fig. 2, and well known to those in the art. As is common practice, such miniature films are not provided with a protective backing paper, the exposed image areas being protected by several convolutions of a trailing portion of the film strip.

The spool 11, with its film 14, is placed within a camera, not shown; and, in the preferred arrangement, constitutes both a supply and a take-up spool. In such an arrangement, the film strip is unwound, usually before exposure, from the spool 11 and is passed over a roller 15 to be later described, through the film gate of the camera, not shown, and is finally coiled up in a suitable receptacle or compartment, also not shown, positioned on the opposite side of the gate. The spool 11 thus serves as a film supply spool. However, as each exposure is made, the exposed film area is then wound back onto the spool 11 and the latter then serves as a takeup spool. With such an arrangement, the inner end of the film strip is securely anchored to the core 12, for obvious reasons. However, it may be desirable to successively make the exposures as the film strip is unwound from the spool. After the final exposure, the strip is then rewound back onto the spool. In either case, the spool constitutes both a supply and take-up spool.

It is contemplated, however, that the spool 11 may constitute merely a supply spool and the film may be completely unwound therefrom, and, after passing over a concave guide roller 16 and over the exposure aperture 17, may be finally wound up on a separate take-up spool 18, as shown in Fig. 4. In this arrangement, the inner end of the film spool is not anchored to the core 12 of the spool 11. As the specific camera construction does not constitute a part of the present invention, a showing thereof is not deemed necessary to a full understanding of the present invention.

When a new and unexposed film spool is received by the user, the leading end 19 is arranged in overlying relation with adjacent film convolutions, as shown in Fig. 5. This leading end may be withdrawn and secured to a take-up spool, such as shown in Fig. 4, or may be merely wound into a suitable receptacle, not shown, prior to exposure.

As the various exposures are made, the film strip is wound up on the take-up spool 11 or the take-up spool 18, as the case may be. In order to provide a suitable light lock for the wound-up exposed film strip, the peripheries of the end members 13 are formed with inwardly extending or projecting flanges or beads 24 and 25 which may be equal in size, or they may be made of different sizes, as shown in Fig. 2, to prevent the improper positioning of the spool in the camera. The innermost edges or portions 26 and 27 of the beads or flanges 24 and 25 respectively are spaced a distance slightly less than the width of the film strip 14, as clearly shown in Fig. 2. By means of this arrangement, the film strip must be given a slight transverse bend so that the edges 20 may pass between the portions 26 and 27, after which the film strip straightens out to bring the edges 20 into tight engagement with the inner faces 28 of the end members 13, as clearly shown in Fig. 2. This slight transverse bend is imparted to the film strip by means of the concave roller 15 positioned adjacent the take-up spool 11 or 18 and over which the film strip passes on its way to the take-up spool, as clearly illustrated in Figs. 1 and 4. As the supply and take-up spools in Fig. 4 are preferably identical in structure, a concave roller 16 is also positioned adjacent the supply spool, Fig. 4, to impart a slight transverse bend to the film strip so that the latter may be drawn off easily from the left or supply spool and freely passed between flange portions 26 and 27 thereof.

With the spool structure so far described, the entire exposed film strip could be completely wound up on the take-up spool. In such a case, the trailing end of the film 14 would be wound on and would overlie the adjacent convolutions of the film strip. The exposed film roll would then be identical in appearance to the new or unexposed roll shown in Fig. 5. Obviously, with such a spool arrangement, the user would be unable to tell whether or not the film strip had been exposed, and might inadvertently place exposed rolls in the camera and reexpose the film strip, the disadvantages of which are obvious. In order to overcome this possibility, the present invention provides an arrangement by which the end of the trailing strip is not completely wound up so as to provide a projection or extending tab which will clearly indicate that the film strip has been exposed.

To secure this result, the film strip 14 has a pair of aligned notches 32 and 33 formed in the opposite marginal edges 20 of the film strip adjacent the trailing end or edge 35, as clearly shown in Fig. 1. If the flanges or beads 24 and 25 are of equal size, the notches 32 and 33 are also of equal size; but, however, if the beads 24 and 25 are of unequal size, as shown in Fig. 2, the notches 32 and 33 are formed to correspond with the flanges with which they cooperate, as will be presently described.

Now when the exposed film strip, formed with the marginal notches 32 and 33, is wound up on the take-up spool, the film strip passes between the portions 26 and 27 of the beads 24 and 25, as above explained. However, when the notches 32 and 33 are finally brought into registry with the beads 24 and 25, the latter engage in the notches 32 and 33, and thus effectively prevent the passage of the final portion of the film strip therebetween. The result is that further winding up of the film strip is prevented, and a small tab 36 is left projecting or extending from the film spool, as clearly shown in Figs. 2 and 3. This projecting tab 36 clearly indicates to the user, either visually or by touch, that the film strip has been exposed. If desired, the inner face of the tab 36 may be marked with the word "exposed," and when the tab is held in projecting position, the word "exposed" will be clearly visible. However, in a new or unused roll, the tab 36 will overlie the outer film convolutions, as shown in Fig. 5, and the word "exposed" will not be visible.

Thus by means of cooperating notches and flanges, a small trailing portion of the film strip remains unwound and serves to provide a small projecting member or tab which clearly and definitely indicates to the user that the film strip has been already exposed. In such an arrangement the possibility of using a previously exposed film strip is thereby eliminated, the advantages of which are readily apparent. The present invention, therefore, provides a simple, effective, and positive means of clearly and definitely indicating when a film strip has been exposed so as to prevent any inadvertent second exposure thereof.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A film roll comprising, in combination, a film spool, a strip of sensitized photographic film wound on said spool, a pair of inwardly directed annular marginal flanges formed on said spool and spaced apart a distance less than the width of said strip, said strip being formed with a marginal notch positioned adjacent the trailing end of said strip, one of said flanges being engageable in said notch when said trailing end of said strip is wound onto said spool to limit the winding of said strip and to retain said trailing end in projecting position to indicate the exposure of said strip.

2. A film roll comprising, in combination, a film spool, a pair of inwardly directed annular marginal flanges on said spool, a strip of sensitized photographic film adapted to be wound on said spool, an indicating tab formed on the trailing end of said strip, said strip having aligned notches formed on the opposite marginal edges thereof adjacent said tab, said flanges being spaced a distance less than the width of said strip and serving to engage in said notches when said strip is wound onto said spool to limit farther winding of said strip so as to retain said tab in an unwound position and projecting from said spool to indicate the exposure of said strip.

3. A film roll comprising, in combination, a film spool having a core and end members secured to said core, a strip of sensitized photographic film adapted to be wound up on said core, inwardly extending annular marginal flanges formed on said members and spaced apart a distance less than the width of said strip, an exposure indicating tab formed on the trailing end of said strip, said strip being formed with a pair of aligned marginal notches positioned adjacent said tab so that when said strip is wound up on said core said flanges will engage in said notches to prevent the winding up of said tab so that the latter will remain in a position projecting from said spool to indicate the exposure of said strip.

4. A film roll comprising, in combination, a film spool having a core and end members secured to said core, a strip of sensitized photographic film adapted to be wound up on said core, said members being formed with marginal inwardly extending flanges of unequal size, said flanges having aligned portions which are spaced apart a distance less than the width of said strip, an exposure indicating tab formed on the trailing end of said strip, said strip having a pair of aligned notches formed on the opposite marginal edges of said strip, each notch being of a size suitable to receive the portion of the flange on the adjacent member when said strip is wound up to prevent the winding up of said tab to retain the latter in a position projecting from said spool to indicate the exposure of said strip.

5. A film roll comprising, in combination, a film spool, a strip of exposed photographic film wound on said spool, a pair of spaced annular marginal flanges carried by said spool and spaced a distance less than the width of said strip to afford a light lock for said exposed film, said strip being formed with a pair of aligned notches adjacent the trailing end of said strip, an indicating tab formed on said trailing end adjacent said notches, the winding of said strip serving to bring said notches into cooperating relation with said flanges to limit the winding up of said strip to retain said tab in an unwound condition to indicate that said strip has been exposed.

HARLOW D. PHILIPS.